(12) United States Patent
Di Luoffo et al.

(10) Patent No.: US 7,464,159 B2
(45) Date of Patent: Dec. 9, 2008

(54) MANAGING ANALYSIS OF A DEGRADED SERVICE IN A GRID ENVIRONMENT

(75) Inventors: Vincent Valentino Di Luoffo, Sandy Hook, CT (US); Craig Fellenstein, Brookfield, CT (US); Rick Allen Hamilton, II, Charlottesville, VA (US); Joshy Joseph, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1046 days.

(21) Appl. No.: 10/757,270

(22) Filed: Jan. 14, 2004

(65) Prior Publication Data

US 2005/0160318 A1     Jul. 21, 2005

(51) Int. Cl.
    *G06F 15/16* (2006.01)
(52) U.S. Cl. .............. 709/224; 709/202; 709/218; 709/219; 714/2; 714/4; 714/48; 714/52; 714/57
(58) Field of Classification Search ............ 709/224, 709/202, 218, 219; 714/25, 48, 2, 4, 57, 714/52
See application file for complete search history.

(56) References Cited

U.S. PATENT DOCUMENTS

| 5,655,081 | A | 8/1997 | Bonnell et al. ......... 395/200.32 |
| 5,729,472 | A | 3/1998 | Seiffert et al. |
| 6,594,684 | B1 * | 7/2003 | Hodjat et al. .............. 709/202 |
| 6,799,208 | B1 | 9/2004 | Sankaranarayan et al. |
| 6,816,907 | B1 | 11/2004 | Mei et al. |
| 7,086,086 | B2 * | 8/2006 | Ellis ........................ 726/15 |
| 7,269,757 | B2 * | 9/2007 | Lieblich et al. ............... 714/37 |
| 2003/0036886 | A1 | 2/2003 | Stone |
| 2003/0126240 | A1 * | 7/2003 | Vosseler ..................... 709/221 |

FOREIGN PATENT DOCUMENTS

| EP | 0790559 A | 8/1997 |
| EP | 1267552 A | 12/2002 |

OTHER PUBLICATIONS

Fault-Tolerant Grid Architecture and Practice, Jul. 2003, vol. 18, pp. 423-433, J.comput. Sci and Technol, Hai et al.*

(Continued)

*Primary Examiner*—William C. Vaughn, Jr.
*Assistant Examiner*—Djenane M Bayard
(74) *Attorney, Agent, or Firm*—David A. Mims, Jr.; Amy J. Pattillo

(57) ABSTRACT

A method, system, and program managing analysis of a degraded service in a grid environment are provided. In a grid environment of multiple diverse systems, a service availability management agent is enabled to receive multiple types of error messages generated from the multiple diverse systems within the grid environment. Each error message is parsed to determine a general error indicator. Then, the service availability management agent attempts to resolve the general error indicator and return a solution to each parsed error message. Solutions may include an adjustment of resource usage by a particular service, an explanation of a particular error message, or a recommendation of alternate resources. The service availability management agent preferably specifies the transmission of the solution in a format specified for the requester system.

2 Claims, 6 Drawing Sheets

OTHER PUBLICATIONS

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian Xu et al, "Tools and Support for Deploying Applications on the Grid" Services Computing, 2004. Proceedings 2004 International Conferenec on Shanghai, China, Sep. 15-18, 2004, Piscataway, NJ, IEEE, pp. 281-287.

Ian Foster and Carl Kesselman, "Grid2—Blueprint for a New Computing Infrastructure" 2004, Elsevier, San Francisco, CA, chapter 20, Instrumentation and Monitoring, pp. 319-343.

Smallen S et al, "The Inca Test Harness and Reporting Framework" Supercomputing 2004. Proceedings of the ACM/IEEE SC2004 Conference Pittsburgh, PA, Nov. 2004, p. 1-10.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.

Gever DH, et al, "WWW-based performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548.

Chase, JS et al, "Dynamic Virtual Clusters in a Grid Site Manager", High Performance Distributed Computing 2003. Proceedings. 12th IEEE International Symposium, Jun. 22-24, 2003, Piscataway, NJ, USA, IEEE, pp. 90-100.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA. IEEE, vol. 2, Apr. 9, 2003, pp. 1715-1718.

Kubicek, C, et al., "Dynamic Allocation of Servers to Jobs in a Grid Hosting Environment", BY Technology Journal, vol. 22, No. 3, Jul. 2004, pp. 251-260.

"Method of Providing On-Demand-Computing for Server Blades", IP.com Journal, IP com Inc., West Henrietta, NY, US, Sep. 8, 2003, p. 1.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, "A Fault Tolerance Service for QoS in Grid Computing", Lecture Notes in Computer Science, vol. 2659, Aug. 2003, pp. 286-296.

Foster et al.; The Anatomy of the Grid, Enabling Scalable Virtual Organizations; available at www.globus.org/research/papers/anatomy.pdf as of Nov. 27, 2003.

Foster et al.; The Physiology of the Grid, An Open Grid Services Architecture for Distributed Systems Integration; available at www.globus/org/research/papers/ogsa.pdf as of Nov. 27, 2003.

Foster, Ian; What is the Grid? A Three Point Checklist; available at www-fp.mcs.anl.gov/~foster/Articles/WhatIsTheGrid.pdf as of Nov. 27, 2003.

Ferreira et al.; IBM Redpaper—Globus Toolkit 3.0 Quick Start; available at www.redbooks.ibm.com/redpapers/pdfs/redp369 as of Nov. 27, 2003.

IBM Grid Computing—What is Grid Computing; available at www-1.ibm.com/grid/about_grid/what_is.shtml as of Nov. 27, 2003.

Berstis, Viktors; IBM Redpaper—Fundamentals of Grid Computing; available at www.redbooks.ibm.com/redpapers/pdfs/redp3613.pdf as of Nov. 27, 2003.

Jacob, Bart; IBM Grid Computing—Grid Computing: What are the key components?; available at www-106.ibm.com/developerworks/grid/library/gr-overview/ as of Nov. 27, 2003.

Unger et al.; IBM Grid Computing—A Visual Tour of Open Grid Services Architecture; available at www-106.ibm.com/developerworks/grid/library/gr-visual/ as of Nov. 27, 2003.

Edited by Rajkumar Buyya; Grid Computing Info Centre: Frequently Asked Questions (FAQ); available at http://www.cs.mu.oz.au/~raj/GridInforware/gridfaq.html as of Nov. 27, 2003.

* cited by examiner

MANAGING ANALYSIS OF A DEGRADED SERVICE IN A GRID ENVIRONMENT

CROSS-REFERENCE TO RELATED APPLICATIONS

The present application is related to the following co-pending applications:

(1) U.S. patent application Ser. No. 10/757,282, filed Jan. 14, 2004.

BACKGROUND OF THE INVENTION

1. Technical Field

The present invention relates in general to grid environments and in particular to managing errors in a grid environment. Still more particularly, the present invention relates to managing analysis of errors indicating degraded service in a grid environment, such that clients in a grid environment are provided with a response when the grid environment is operating at suboptimal conditions.

2. Description of the Related Art

Ever since the first connection was made between two computer systems, new ways of transferring data, resources, and other information between two computer systems via a connection continue to develop. In a typical network architecture, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, have led to the development of Grid technologies using open standards for operating a grid environment. Grid environments support the sharing and coordinated use of diverse resources in dynamic, distributed, virtual organizations. A virtual organization is created within a grid environment when a selection of resources from geographically distributed systems operated by different organizations with differing policies and management systems is organized to handle a job request.

An important attribute of a grid environment that distinguishes a grid environment from merely that of another management system is quality of service maintained across multiple diverse sets of resources. A grid environment preferably does more than just provide resources; a grid environment provides resources with a particular level of service including response time, throughput, availability, security, and the co-allocation of multiple resource types to meet complex user demands.

A reality of network systems in a grid environment, however, is that clients requesting services and resources handling services may fail or degrade in some way. Further, the reality of network systems in a grid environment is that networks may become overloaded with traffic. In essence, when some part of the grid environment is working at a suboptimal level, errors occur because clients receive a degraded service in some manner.

In a typical client/server system or cluster system, limited error management systems only monitor for operating conditions of server systems as a whole and only respond to catastrophic errors rather than checking for a malfunction of a particular component of a server system. In addition, a typical cluster system is self-contained and thus any limited error management is handled by logic at the network layer level, such as the TCP/IP layer level. In a grid environment, however, a failed server system is not the only type of error that needs to be handled; errors may occur in a grid environment as a result of any service degradation in a grid environment. Further, in a grid environment, as opposed to a cluster system, multiple heterogeneous systems are combined such that limited error management at the network layer level is insufficient.

Thus, when there is suboptimal performance within a grid environment, an issue arises of how to maintain the quality of service and handle the diversity of errors that may occur across diverse system. Therefore, it would be advantageous to provide a management agent within a grid environment that may be triggered by any of multiple systems operating within a grid environment when an error occurs, wherein the management agent evaluates the error message and generates responses to the error. Further, it would be advantageous to provide a management agent within a grid environment that may be triggered by errors resulting from suboptimal performance, rather than only complete failure of performance.

SUMMARY OF THE INVENTION

The present invention relates in general to grid environments and in particular to managing errors in a grid environment. Still more particularly, the present invention relates to managing analysis of errors in a grid environment, such that clients accessing diverse systems providing resources in a grid environment are provided with a client specified response when the grid environment is operating at suboptimal conditions.

According to one embodiment of the invention, a grid environment includes multiple diverse systems. A service availability management agent is enabled to receive multiple types of error messages generated from the multiple diverse systems within the grid environment. Each error message is parsed to determine a general error indicator. Then, the service availability management agent attempts to resolve the general error indicator and return a solution to each parsed error message. Solutions may include an adjustment of resource usage by a particular service, an explanation of a particular error message, or a recommendation of alternate resources. The service availability management agent preferably specifies the transmission of the solution in a format specified for the requester system.

The service availability management agent may resolve the error first by using a policy defined for the general error indicator. According to one embodiment, the policy is validated against an XML document-type-definition (DTD). Alternatively, the service availability management agent may resolve the error by distributing the parsed error message to a troubleshooting agent that is specialized in resolving specific types of errors. The troubleshooting agent may further distribute the parsed error message to another level of troubleshooting agents that further specialize the types of errors resolved.

The service availability management agent may be located within a single system or distributed across a selection of the diverse systems in a grid environment. Further, the service availability management agent is operable on error returned from multiple layers of a grid architecture.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
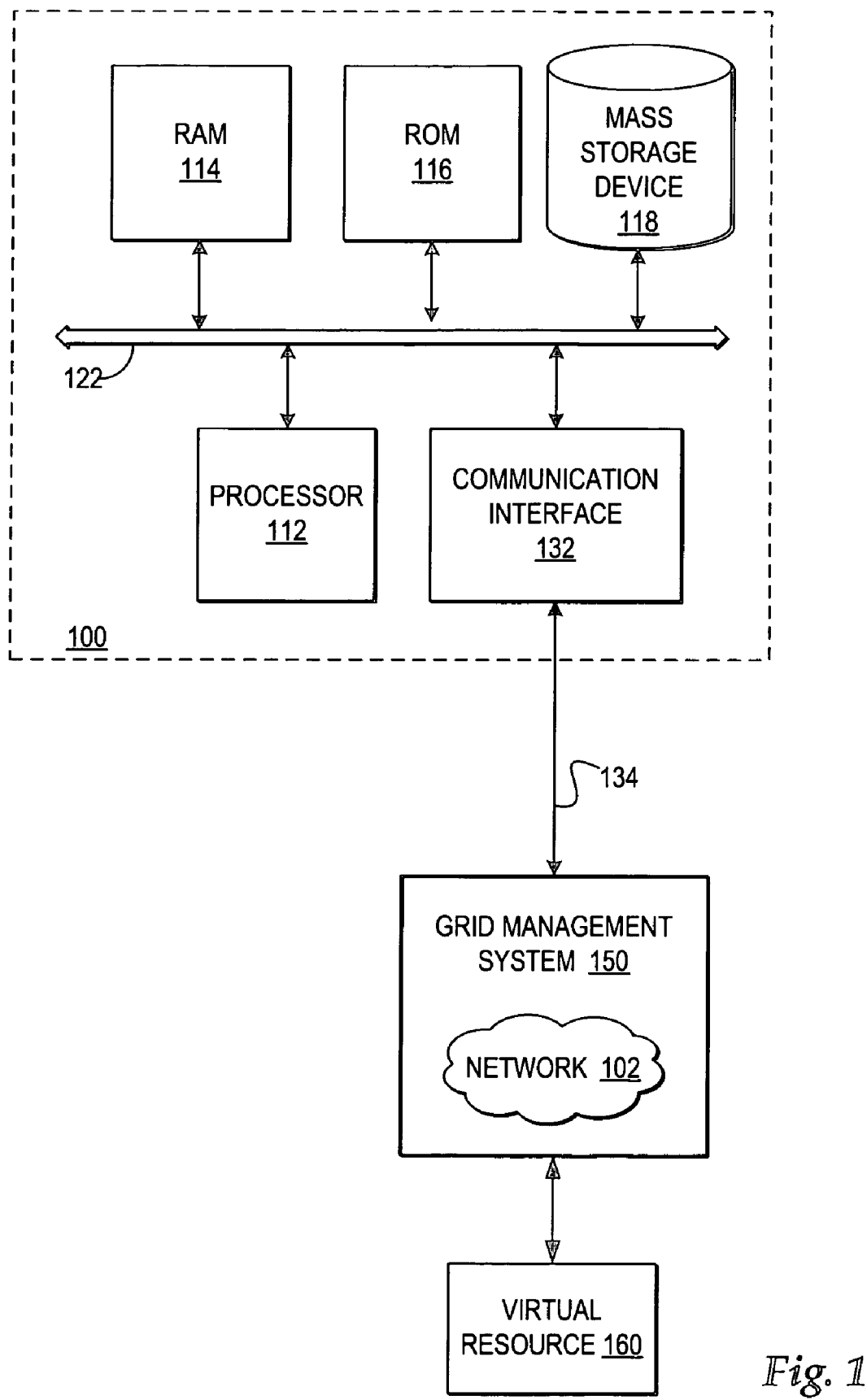
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 preferably includes low-latency and higher latency paths that are connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In a preferred embodiment, application software contains machine executable instructions that when executed on processor 112 carry out the operations depicted in the flowcharts of FIGS. 9, 10, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided by a grid management system 150. Grid management system 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
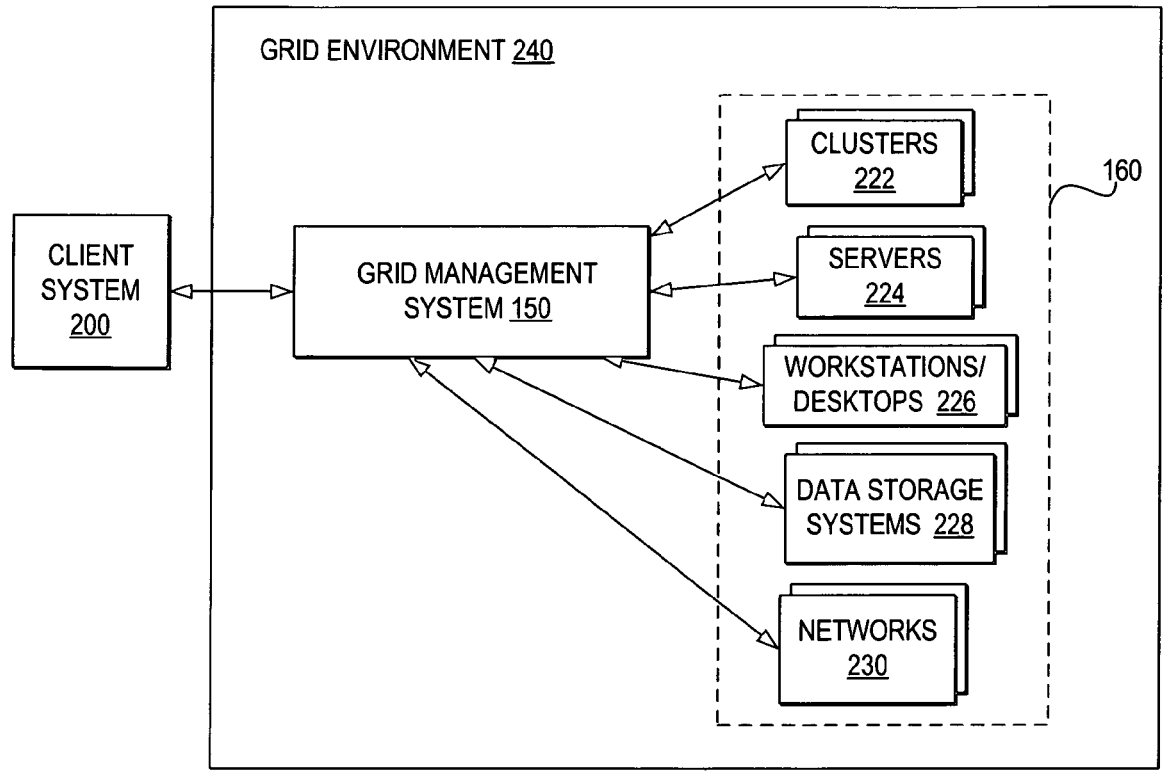
FIG. 2 is block diagram illustrating one embodiment of the general types of components within a grid environment.

With reference now to FIG. 2, a block diagram illustrates one embodiment of the general types of components within a grid environment. In the present example, the components of a grid environment 240 include a client system 200 interfacing with a grid management system 150 which interfaces with server clusters 222, servers 224, workstations and desktops 226, data storage systems 228, and networks 230. For purposes of illustration, the network locations and types of networks connecting the components within grid environment 240 are not depicted. It will be understood, however, that the components within grid environment 240 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 240 are merely representations of the types of components within a grid environment. A grid environment may simply be encompassed in a single computer system or may encompass multiple enterprises of systems.

The central goal of a grid environment, such as grid environment 240 is organization and delivery of resources from multiple discrete systems viewed as virtual resource 160. Client system 200, server clusters 222, servers 224, workstations and desktops 226, data storage systems 228, networks 230 and the systems creating grid management system 150 may be heterogeneous and regionally distributed with independent management systems, but enabled to exchange information, resources, and services through a grid infrastructure enabled by grid management system 150. Further, server clusters 222, servers 224, workstations and desktops 226, data storage systems 228, and networks 230 may be geographically distributed across countries and continents or locally accessible to one another.

In the example, client system 200 interfaces with grid management system 150. Client system 200 may represent any computing system sending requests to grid management system 150. In particular, client system 200 may send job requests and jobs to grid management system 150. Further, while in the present embodiment client system 200 is depicted as accessing grid environment 240 with a request, in alternate embodiments client system 200 may also operate within grid environment 240.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 may be physically encompassed within client system 200.

One function of grid management system 150 is to manage job requests and jobs from client system 200 and control distribution of each job to a selection of computing systems of virtual resource 160 for use of particular resources at the available computing systems within virtual resource 160. From the perspective of client system 200, however, virtual resource 160 handles the request and returns the result without differentiating between which computing system in virtual resource 160 actually performed the request.

To implement grid environment 240, grid management system 150 facilitates grid services. Grid services may be designed according to multiple architectures, including, but not limited to, the Open Grid Services Architecture (OGSA). In particular, grid management system 150 refers to the management environment which creates a grid by linking computing systems into a heterogeneous network environment characterized by sharing of resources through grid services.

Grid environment 240, as managed by grid management system 150, may provide a single type of service or multiple types of services. For example, computational grids, scavenging grids, and data grids are example categorizations of the types of services provided in a grid environment. Computational grids may manage computing resources of high-performance servers. Scavenging grids may scavenge for CPU resources and data storage resources across desktop computer systems. Data grids may manage data storage resources accessible, for example, to multiple organizations or enterprises. It will be understood that a grid environment is not limited to a single type of grid categorization.

Figure 3:
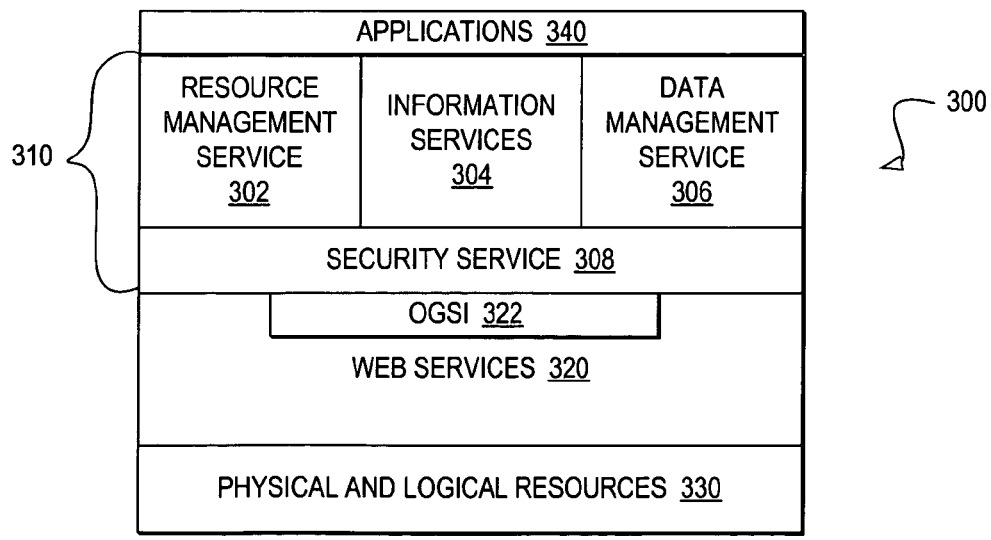
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), eXtensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes receiving job requests, scheduling job requests, distributing jobs, and managing the retrieval of the results for jobs. Resource management service 302 preferably monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manages the information transfer and communication between computing systems within the grid. Since multiple communication protocols may be implemented, information services 304 preferably manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate. It is important to note that while an application and a grid service are positioned within different layers of the grid architecture 300, a reference to an application in general also encompasses grid services exposed through the application.

Figure 4:
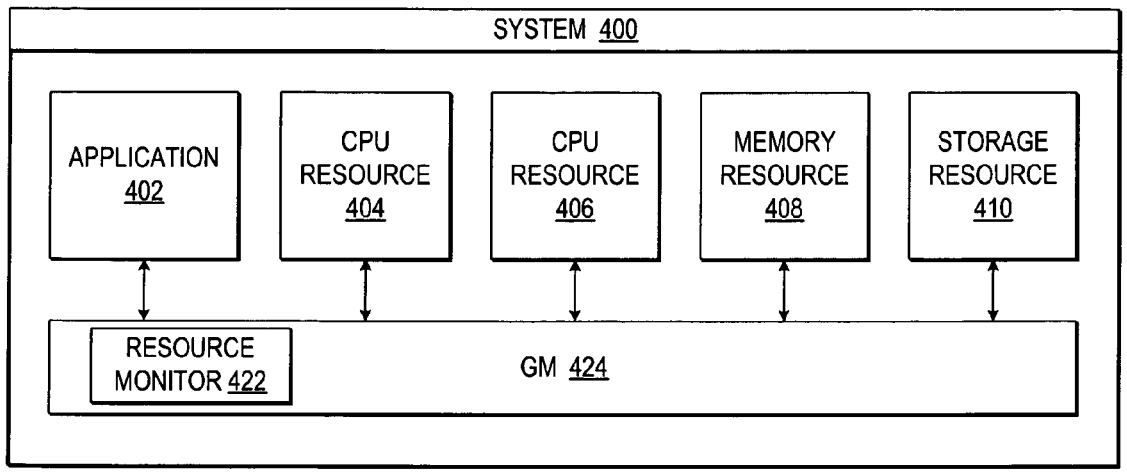
FIG. 4 is a block diagram depicting a system operating within the grid environment from the perspective of the grid management system is depicted in accordance with the method, system, and program of the present invention.

With reference now to FIG. 4, a block diagram of a system operating within the grid environment from the perspective of the grid management system is depicted in accordance with the method, system, and program of the present invention. As illustrated in FIG. 1, a computer system includes many hardware components. As part of a grid environment, however, these hardware components are viewed as resources. For example, a system 400 includes an application resource 402, two CPU resources 404 and 406, a memory resource 408, and a storage resource 410. The resources in system 400 are typical of the types of resources when viewed within the grid environment, however, in an alternate embodiment, other types of resources may be provided. Further, the resources in system 400 may be physically located within a single computer system or distributed across multiple computer systems connected by a network, for example As part of the grid management system described in FIG. 2, a grid manager and router (GM) 424 provides the interface between the resources of system 400 and client systems sending requests.

In particular, a resource monitor 422 within GM 424 monitors the working status of each of the resources available in system 400. GM 424 preferably sends status reports to other grid managers and routers within the grid environment to indicate the availability of the resources in system 400. Additionally, status reports may describe the computer hardware, operating system, and resources of system 400. Status reports may be generated, for example, when system 400 joins or leaves the grid environment, when a threshold is detected, at predetermined time intervals, and on specific predetermined events, including, but not limited to a hardware fault or a portion of a service failing.

Figure 5:
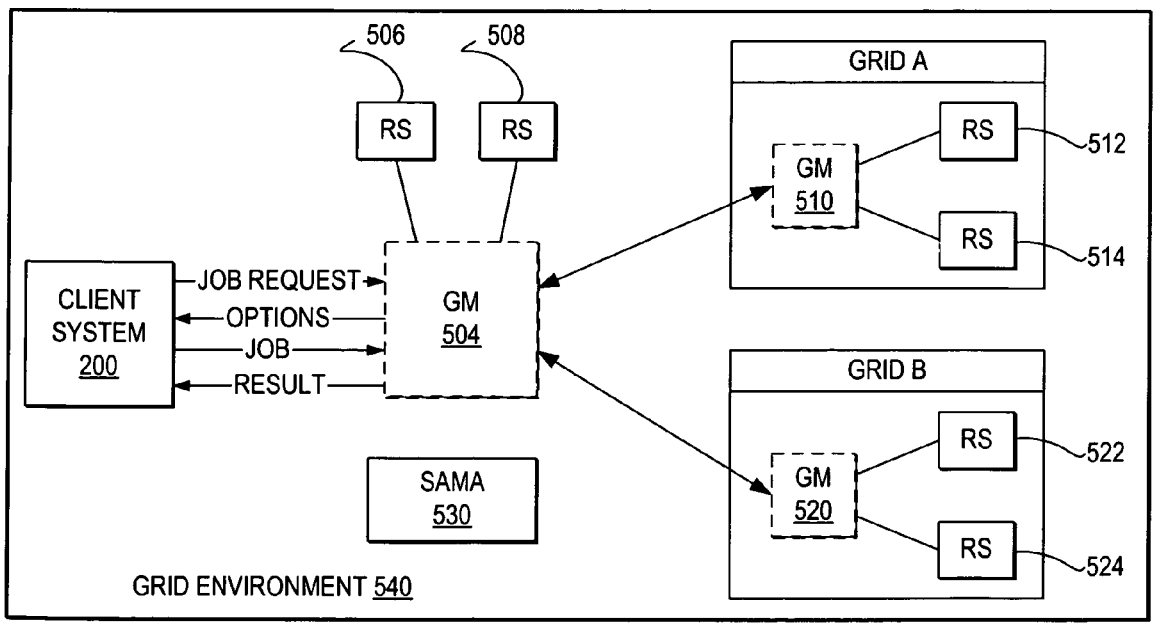
FIG. 5 is an illustrative representation depicting one embodiment of the logical infrastructure of a grid environment in which the present invention may be implemented.

Referring now to FIG. 5, an illustrative representation depicts one embodiment of the logical infrastructure of a grid environment in which the present invention may be implemented. While FIG. 2 depicts an example of general components of a grid environment, in the present figure, an example of how the general components are viewed logically within a grid environment is illustrated in a grid environment 540. In particular, the grid management system functions are logically dispersed into multiple GMs, such as GM 504, GM 510, and GM 520. Further, the virtual resource is logically dispersed into multiple resources (RSs), such as RS 506, RS 508, RS 512, RS 514, RS 522, and RS 524. It is important to note that a resource may not be a direct representation of a physical resource, but rather a logical representation of one or more physical resources and or groups of physical resources.

In the example, client system 200 sends a job request to GM 504. GM 504 searches for resources available to handle the job specified in the job request. In particular, GM 504 checks whether RS 506 and RS 508 can handle the job specified in the job request and may send queries to other GMs, such as GM 510 or GM 520. GMs 510 and 520 return reports on the availability of resources to handle the job request.

In particular, a job request preferably includes a request made through a particular application for a grid service. In general, an application is self-contained, but exposes the grid services layer. The resources necessary to handle the job request are those necessary to handle the request as specified by the application and services accessed.

For purposes of illustrations, RS 506 and RS 508 are considered local resources or resources within the same discrete set of resources to which jobs from client system 200 are submitted. In the examples following, when RS 506 and 508 are not meeting performance requirements for a job from client system 200, then additional resources may be allocated including other resources within the same discrete set of resources, capacity on demand resources, resources from internal grids and finally resources from external grids.

More specifically, in the example, GM 510, RS 512, and RS 514 are part of one grid infrastructure "grid A" operated by a first business that provides a first specified number of grid services for a first specified price. Then, GM 520, RS 522, and RS 524 are part of another grid infrastructure "grid B" operated by a second business that provides a second specified number of grid services for a second specified price. When GM 504 sends the job request to GM 510 and GM 520, the each GM preferably reports whether the job request can be handled and a price for handling the request. In relation to client system 200, grids A and B may be internal grids operating within the same enterprise system as client system 200 or external grids.

After receiving reports on the availability of resources, GM 504 collects the options for handling the job and returns the options to client system 200. Client system 200 may then decide to select a preferred option and send the job to have handled according to the selected option. GM 504 manages the return of the results of the job to client system 200.

The resources utilized in the option selected by client system 200 form a virtual organization for handling the job. For example, if client system 200 selects an option to handle the job based on the option returned from GM 510, then a virtual organization may be formed to process the job which would include GM 504, GM 510, RS 512, and RS 514.

According to an advantage of the present invention, if the virtual organization handling a job provides suboptimal performance, then any of the GMs or RSs in the virtual organization may generate an error indicating degraded service in the grid environment. Further, client system 200 may generate an error if client system 200 encounters degraded service from the grid environment. GMs, RSs or client system 200 may then pass the error message among each other and transmit the error message to a Service Availability Management Agent (SAMA) 530.

Service Availability Management Agent (SAMA) 530 is preferably accessible within grid environment 540. In particular, SAMA 530 may be incorporated within a single system or cloned and distributed across multiple systems. Further, within grid architecture 300 of FIG. 3, SAMA 530 may be implemented to handle errors from multiple functional levels. For example, SAMA 530 may be implemented in part as a web service and in part as a resource management service.

In general, SAMA 530 performs the functions of monitoring grid resources, policy coordination, application profile management, analytical processing, and problem dispatch for grid environment 540. SAMA 530 may be controlled by dynamic policies that manage its behavior while performing error management. In particular, errors may occur within grid environment 530 when degraded services are detected. Degraded services may be detected when jobs function at suboptimal conditions or the grid fails to provide required services. Such suboptimal performance may occur as a result of a system failure, a network infrastructures dropping or becoming overloaded, or other failures that occur within grid environment 540.

SAMA 530 preferably analyzes and responds to each error message received. For example, the response may include a solution to the error to the client system or may include an indicator that resource availability within grid environment 540 was adjusted to solve the error.

It is important to note that while the present invention is described with reference to SAMA 530 responding to errors indicating degraded service, errors managed by SAMA 530 may also indicate other types of degradation within grid environment 540.

Figure 6:
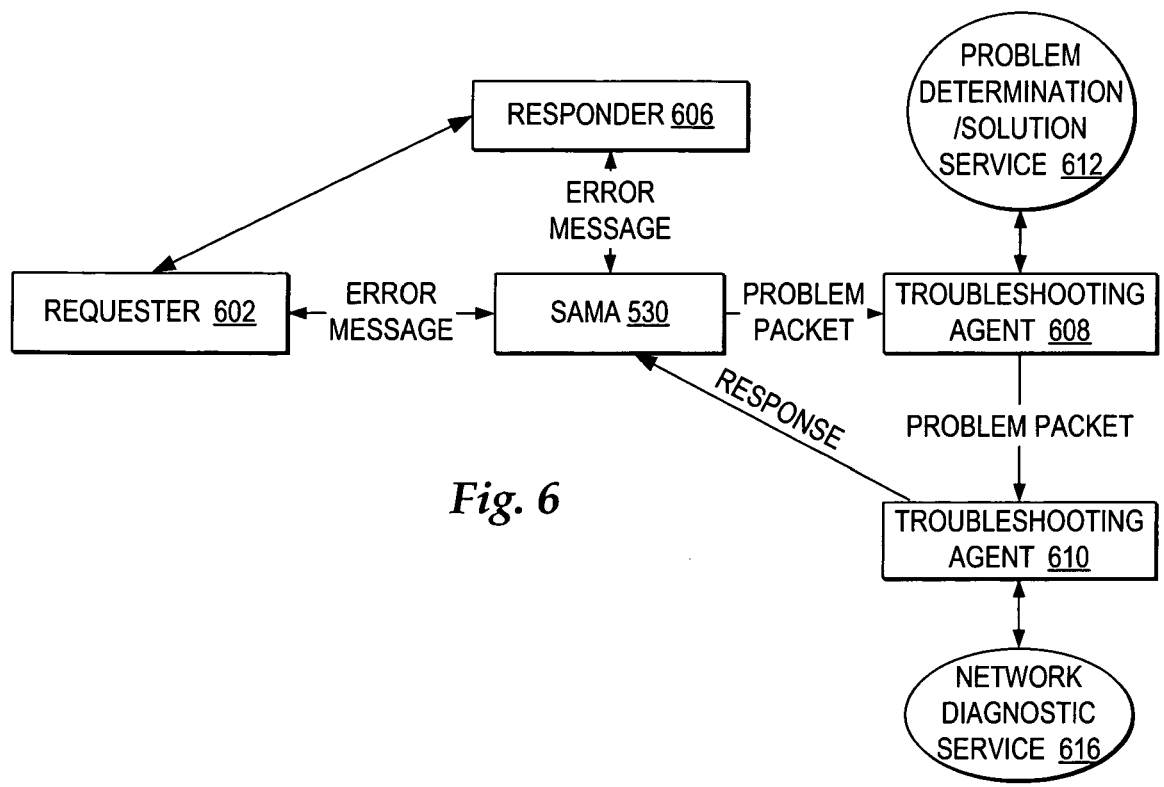
FIG. 6 is a block diagram depicting one embodiment of an error management system with a grid environment.

With reference now to FIG. 6, there is depicted a block diagram of one embodiment of an error management system with a grid environment. In general, requester 602 sends a job request to responder 606. Requester 602 may include, for example, client systems or other organized systems operating within the grid environment or accessing the grid environment. Responder 606 may represent a resource node or nodes logically represented within a grid environment. Responder 606 provides an acknowledgement or response to the job request. In the case of an error response, requester 602 or responder 606 may send an error message to SAMA 530.

SAMA 530 preferably manages analysis of an error messages and returns a response in a format specified for requester 602. A response may specify a solution which includes an explanation of the error, a recommendation of alternate resources, of an indication that resource usage has been adjusted, for example. In managing the analysis error message, SAMA 530 may dispatch the error message to a troubleshooting agent 608. Troubleshooting agent 608 preferably includes additional tools for performing error analysis and problem solving. For example, troubleshooter agent 608 implements a problem determination and solution service 612. Further, troubleshooting agent 608 may distribute the error message to specialized troubleshooting agents that specialize in solving particular types of errors. For example, a troubleshooting agent 610 implements a network diagnostic service 616 that specifically analyzes network related errors. Troubleshooting agents may be domain specific and may include, but are not limited to, network troubleshooters, application troubleshooters, and service troubleshooters.

In an example, requester 602 is a customer submitting an order to on-line retailer A. Requester 602 receives a general error message in return. Requester 602 then transmits the general error message to SAMA 530 for error management. SAMA 530 determines that the network infrastructure for handling orders for on-line retailer A is overloaded, resulting in degraded service within the grid environment. SAMA 530 may send the error message to troubleshooting agent 608 for this error determination or may implement logic within SAMA 530 for this error determination. Further, SAMA 530 or troubleshooting agent 608 may determine that an alternate URL with access to additional network resources can handle the order or may adjust the distribution of network resources in the grid environment so that the order can be handled. SAMA 530 preferably returns a result to requester 602. The result may include a message specifying the type of error, such as a message specifying that the network is currently overloaded. In addition, the result may include a recommendation in the form of an action for a user or automated process at requester 602 to choose. Further, the result may indicate an action that was taken to attempt to give additional resources to the degraded service.

Figure 7:
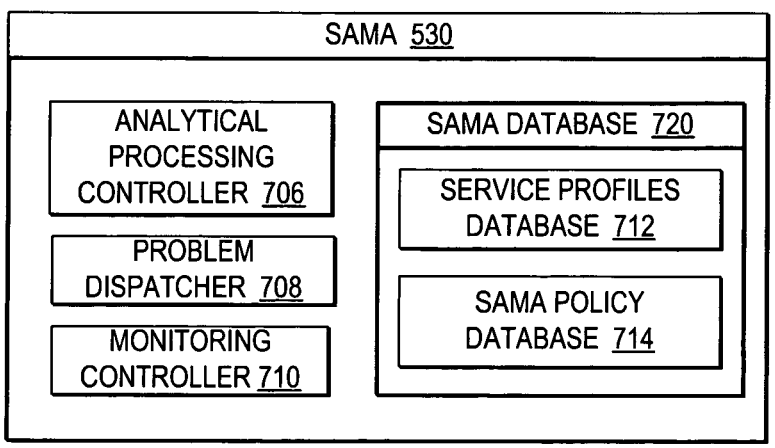
FIG. 7 is a block diagram depicting one embodiment of components of a SAMA in accordance with the method, system, and program of the present invention.

Referring now to FIG. 7, there is illustrated a block diagram one embodiment of the components of a SAMA in accordance with the method, system, and program of the present invention. In particular, SAMA 530 includes multiple controllers for providing error service management. While in the present embodiment a single controller is depicted, in alternate embodiments, SAMA 530 may be distributed across multiple locations, wherein selections of the available controllers may operate at each of the multiple locations. Further, in one embodiment, SAMA 530 may be performed by a web application that runs when invoked by a system transmitting an error in a grid environment. In the embodiment, the web application is supported by SAMA database 720 to store data needed to manage error message.

Each of the functions performed by the controllers within SAMA 530 is controlled by rules set by policies. These policies are preferably stored in SAMA database 720. SAMA database 720 may be implemented in general in a database structure and more specifically in a Lightweight Directory Access Protocol (LDAP) directory. While depicted as combined with the controllers of SAMA 530, SAMA database 720 may be distributed across multiple storage systems or located within a single storage system.

First, a service profiles database 712 includes profile information about applications and services enabled to execute in the grid environment. In particular, service profiles designate the operating characteristics of a service, such as the minimal levels of processing resources required to perform the minimal service functions. It is important to note that in addition to service profiles, applications profiles, agent profiles, and other profiles of controllers operating within the grid environment may be included in service profiles database 712. As described in U.S. patent application Ser. No. 10/757,282, SAMA 530 may adjust the resources available to a service based on the service profile for the service when an error indicating suboptimal service is received or suboptimal service is monitored.

Second, a SAMA policy database 714 includes policies for analyzing error messages according to general error indicator, type of service, and requester or responder identifier. The policies may designate, for example, that if an error message indicates that business logic failed, then a response is that the business service is "not available" and that the error message should be dispatched to the troubleshooter for additional error analysis. If the error message indicates, however, that business logic is not optimal, then the policy may designate a response that the business service is "intermittently functional."

Within SAMA 530, an analytical processing controller 706 parses error messages to extract a general error indicator and other content such as a requester or responder identifier and a service type. From the general error indicator, a requester or responder identifier, and a service type, analytical processing controller 706 determines the relevant service profiles and SAMA polices for the error type from service profiles database 712 and SAMA polices database 714. Once an error message is parsed and resolved, then a problem dispatcher 708 dispatches problem packets to other controllers within SAMA 530 and to troubleshooting agents. The problem packets preferably include the parsed error message. A monitoring controller 710 monitors the status of resources accessible within the grid environment for use by analytical processing controller 706 in determining a solution to the error message.

Figure 8:
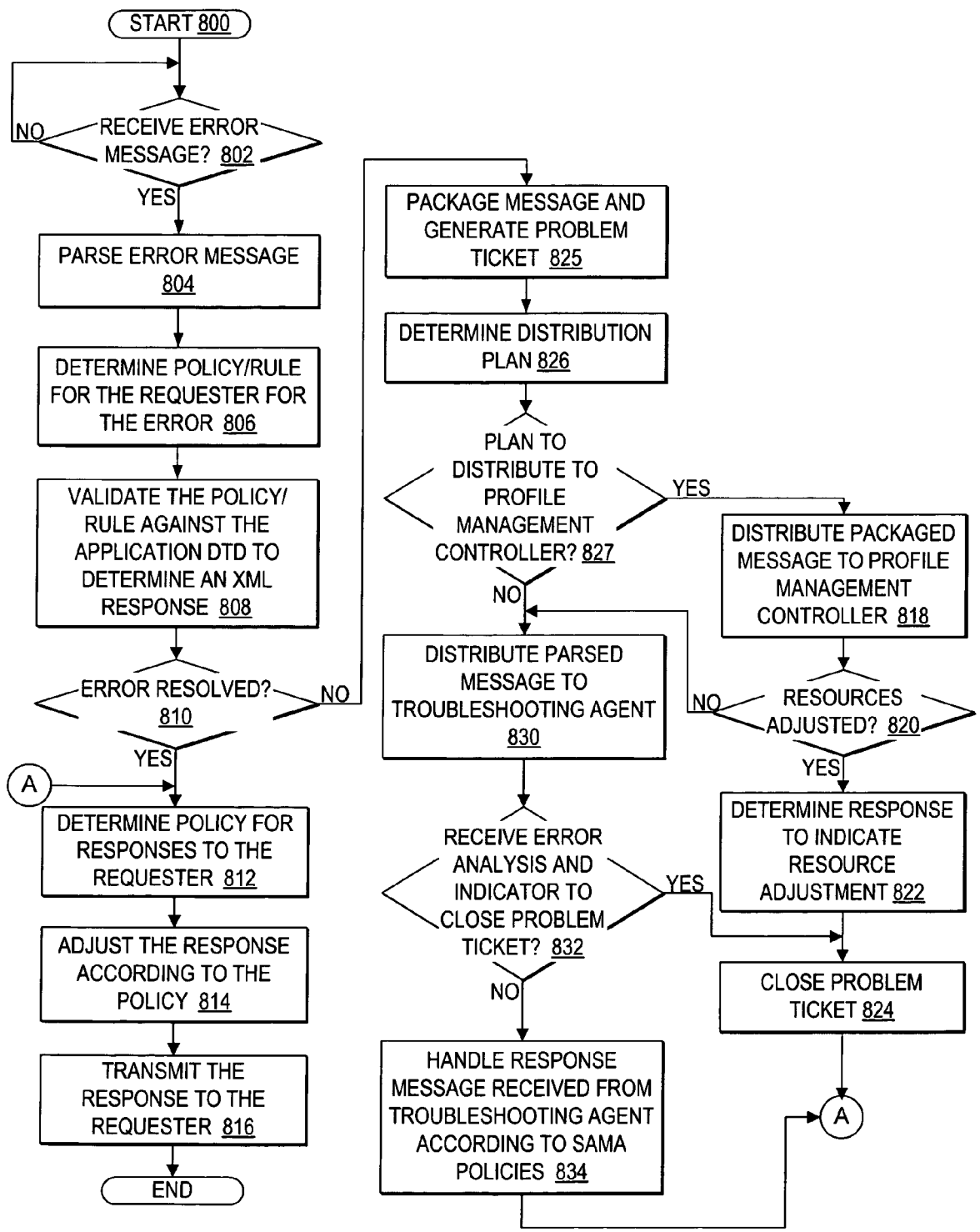
FIG. 8 depicts a high level logic flowchart of a process and program for error management within a grid environment in accordance with the method, system, and program of the present invention.

Referring now to FIG. 8, there is depicted a flow diagram for error management in a grid environment in accordance with the method, system, and program of the present invention. As depicted, the process starts at block 800 and thereafter proceeds to block 802. Block 802 depicts a determination whether an error message is received. If an error message is not received, then the process iterates at block 802. If an error message is received, then the process passes to block 804. Block 804 depicts parsing the error message to extract the details of the error including, but not limited to, a general error indicator, an application identifier, and a requester identifier. Next, block 806 illustrates determining the policy and rules for the service and the requester for a particular type of error. In particular, SAMA policy database 714 may be searched for rules and policies associated with the error. Next, block 808 depicts validating the policy or rule against the application DTD to determine an XML response. For purposes of example, Table 1 depicts an application DTD which may be implemented in the invention. In an alternate embodiment, a response may be formatted in an alternate protocol or method.

TABLE 1

```
<xml version="1.0" encoding ="UTF-8"?>
***************************************************************
SAMA DTD - Version 1.0
***************************************************************
    +: One or more permitted
    *: Zero or more permitted
    ?: Optional
***************************************************************
-->
<!-- SAMA Definition -->
<! ELEMENT SAMA Application(Rules*, Policy+, DataElement*)>
<!- Rules Information -->
<! ELEMENT Rules Data EMPTY>
<!ATTLIST RulesData
```

TABLE 1-continued

```
    RuleName CDATA # REQUIRED
    RuleVersion CDATA # REQUIRED
    RuleDescription CDATA #REQUIRED
    RuleData CDATA #REQUIRED
<! -Policy Information -->
<! ELEMENT Policy Data EMPTY>
<! ATTLIST PolicyData
    PolicyName CDATA # REQUIRED
    PolicyVersion CDATA # REQUIRED
    PolicyDescription CDATA #REQUIRED
    PolicyData CDATA #REQUIRED
<! ELEMENT Data Element EMPTY>
<! ATTLIST DataElement
    Name CDATA # REQUIRED
    Description CDATA # REQUIRED
    External CDATA #REQUIRED
    DataType (CON | VAR ) #REQUIRED
    LengthType (FIX | VAR ) #REQUIRED
    DataLength CDATA #REQUIRED
    Value CDATA #IMPLIED
```

Next, block 810 depicts a determination of whether the error is resolved. If the error is resolved from the validated policy or rule, then the process passes to block 812. Block 812 depicts determining the policy for responses to the requester. For example, responses may be formatted for particular requester systems depending on the type of grid service subscribed to by a requester system. Next, block 814 depicts adjusting the response according to the policy. Thereafter, block 816 depicts transmitting the response to the requester system, and the process ends.

Alternatively, at block 810 if the error is not resolved, then the process passes to block 825. Block 825 depicts packing the message and generating a problem ticket to track the distribution of the error message. Next, block 826 depicts determining a distribution plan for the error message. Policies may indicate which troubleshooting agent should receive the error message and whether the error message should be distributed to a profile management controller. Block 827 illustrates a determination whether the distribution plan includes distributing the packaged message to a profile management controller. If the plan includes the profile management controller, then the process passes to block 818. Block 818 depicts distributing the packaged message to the profile management controller. As described in more detail in U.S. patent application Ser. No. 10/757,270, a profile management controller preferably adjusts resource usage by a service or application. In particular, the profile management controller may determine if a service can be rerouted to other resource nodes in the grid environment or if modules of a service can be shut down to maintain the minimal performance requirements of the service. Next, block 820 depicts a determination whether an acknowledgement is received indicating that resources were adjusted. If resources were not adjusted, then the process passes to block 830. If resources were adjusted, then the process passes to block 822. Block 822 depicts forming a response to indicate the resource adjustment. Thereafter, block 824 depicts closing the problem ticket, and the process passes to block 812.

At block 827, if the plan does not include distributing the packaged message to a profile management controller, then the process passes to block 830. Block 830 depicts distributing the parsed message to a troubleshooting agent. Next, block 832 depicts a determination whether error analysis and an indicator to close the problem ticket are received. If the error analysis and indicator are received, then the process passes to block 824. If the error analysis and indicator are not received, then the process passes to block 834. Block 834 depicts handling the response message received from the troubleshooting agent according to SAMA policies; then, the process passes to block 812. In particular, it is important to note that as parsed error messages are distributed from the SAMA to a troubleshooting agent, relevant service and application profiles are distributed with the message, such that the SAMA enables use of service and application profiles as various troubleshooting stages.

Figure 9:
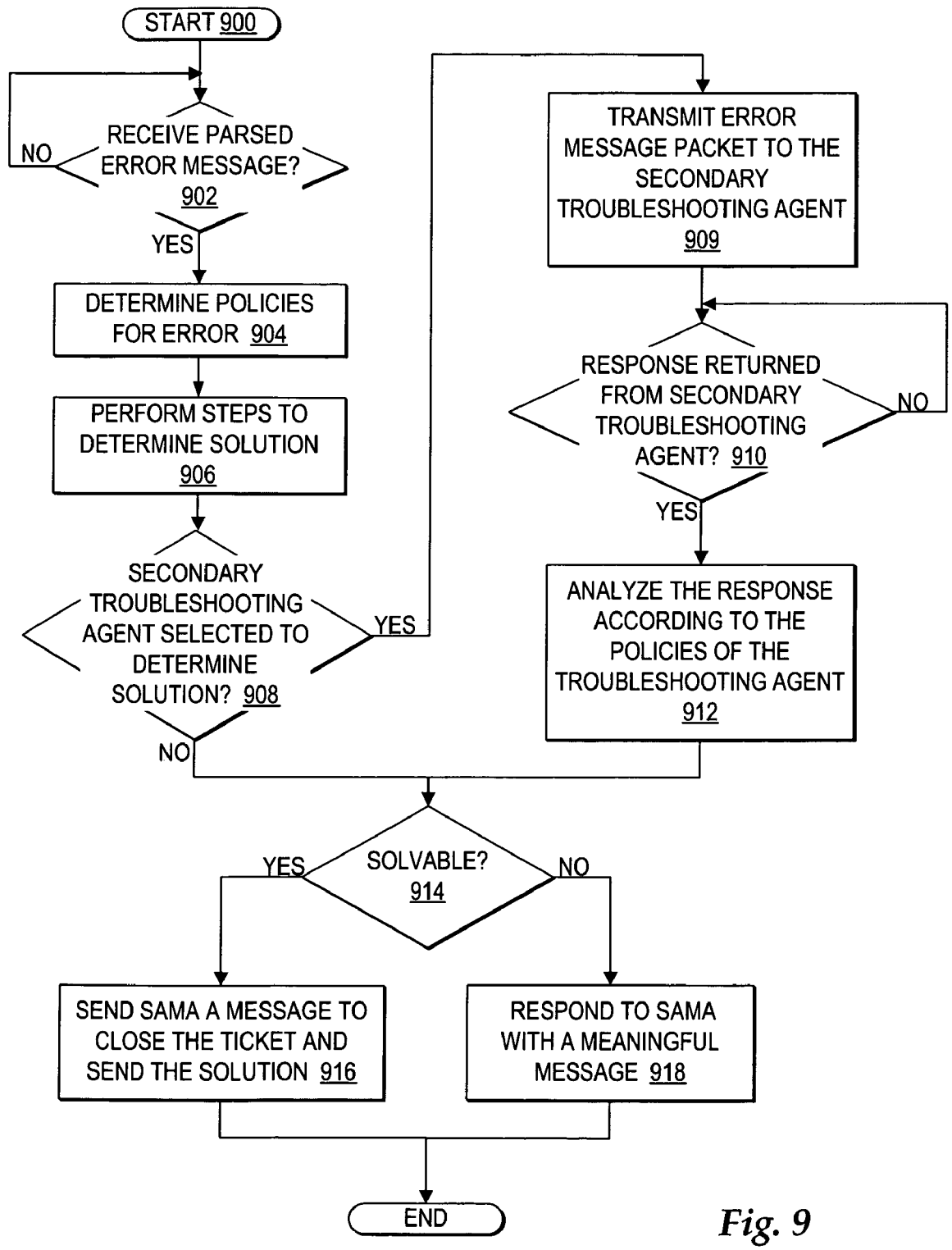
FIG. 9 depicts a high level logic flowchart of the process and program for controlling a troubleshooting agent in accordance with the method, system, and program of the present invention.

With reference now to FIG. 9, there is depicted a high level logic flowchart of the process and program for controlling a troubleshooting agent in accordance with the method, system, and program of the present invention. As depicted, the process starts at block 900 and thereafter proceeds to block 902. Block 902 illustrates a determination of whether a parsed error message is received. If a parsed error message is received, then the process passes to block 904. Block 904 depicts determining policies for the error. In particular, the type of error, requester or responder identifier, or type of service may specify the types of policies for an error. Next, block 906 depicts performing steps to determine a solution, and the process passes to block 908. In particular, a troubleshooting agent performs diagnostic steps to identify the problem and find a solution. Troubleshooting agents may advantageously be domain specific, such that a troubleshooting agent can perform domain specific diagnostic testing.

Block 908 depicts a determination whether a secondary troubleshooting agent is selected during the steps performed at block 906. If a secondary troubleshooting agent is not selected, then the process passes to block 914. Block 914 depicts a determination whether the error message is solvable at the troubleshooting agent. If the error message is solvable, then the process passes to block 916 which depicts sending the SAMA a message to close the ticket and sending a solution, and the process ends. If the error message is not solvable, then the process passes to block 918 which depicts responding to the SAMA with a meaningful message, and the process ends.

Alternatively, at block 908, if a secondary troubleshooting agent is selected, then the process passes to block 909. Block 909 depicts transmitting the error message packet to the secondary troubleshooting agent. Next, block 910 depicts a determination whether a response is returned from the secondary troubleshooting agent. If a response is not yet returned, then the process iterates at block 910. If a response is returned, then the process passes to block 912. Block 912 depicts analyzing the response according to the policies of the troubleshooting agent, and the process passes to block 914. In particular, the troubleshooting agent may analyze the response from a secondary troubleshooting agent and decide to transmit the error message to another secondary troubleshooting agent with a different specialization.

While the invention has been particularly shown and described with reference to a preferred embodiment, it will be understood by those skilled in the art that various changes in form and detail may be made therein without departing from the spirit and scope of the invention. In particular, it is important to note that while the description of the present invention focuses on the invention operating in the context of grid applications, services, agents, and controllers, the present invention may also apply in the context of normal web services and in distributed architectures in general.

What is claimed is:

1. A method for managing error analysis within a grid environment, comprising:

enabling a grid environment comprising a plurality of computing systems each comprising at least one resource and communicatively connected over a network layer through a grid management system to share each said at least one resource through at least one web service layer atop at least one grid service layer implemented within an open grid services architecture;

receiving, at a first agent implemented within said at least one web service layer and said at least one grid service layer, a plurality of types of error messages generated from said plurality of computing systems and said grid management system, within said grid environment;

parsing, by said first agent, each particular error message from among said plurality of types of error messages to determine a general error indicator, an application identifier, and a requester identifier sending said particular error message;

determining, by said first agent, for each said particular error message, at least one designated policy for said requester identifier;

validating, by said first agent, for each said particular error message, at least one designated policy against a document type definition (DTD) designated for said application identifier to determine an XML response;

determining, by said first agent, for each said particular error message, whether said associated XML response resolves an error in each said particular error message;

responsive to said first agent determining for each said particular error message that said associated XML response resolves said error, adjusting a formatting of said associated XML response by a formatting policy specified for said requester identifier to a solution and transmitting said solution to a requester identified by said requester identifier; and responsive to said first agent determining for each said particular error message that said associated XML responsive fails to resolve said error, packaging each said particular error message and distributing each said particular error message to at least one second agent within said grid environment, wherein said at least one second agent specializes in resolving errors not resolvable by said first agent.

2. The method according to claim 1 for managing error analysis within a grid environment, further comprising:

transmitting said solution comprising at least one from among an adjustment of resource usage by a particular service, an explanation of a particular error message, and a recommendation of alternate resources.

* * * * *